United States Patent Office 3,395,974
Patented Aug. 6, 1968

3,395,974
FORMATION OF VANADIUM TRICHLORIDE FROM VANADIUM TETRACHLORIDE
Ronald Berry, Swinton, Manchester, England, assignor to Magnesium Elektron Limited, Swinton, Manchester, England
No Drawing. Filed Sept. 13, 1965, Ser. No. 487,046
Claims priority, application Great Britain, Sept. 14, 1964, 37,490/64
3 Claims. (Cl. 23—17)

ABSTRACT OF THE DISCLOSURE $VCl_3$ is prepared by decomposing $VCl_4$ in the presence of a catalytic amount of ICl, the mixture of $VCl_4$ and ICl being heated to remove chlorine, and thereafter distilled to remove unconverted $VCl_4$ and ICl, and recovering the remaining solid $VCl_3$.

This invention relates to the preparation of vanadium trichloride by the decomposition of vanadium tetrachloride. It is known that vanadium trichloride may be prepared by boiling vanadium tetrachloride (B.P. 152° C./760 mm.) in a reflux distillation system at atmospheric pressure, the gaseous chlorine also produced during the decomposition being removed as it is evolved in a stream of inert gas such as dry carbon dioxide. The rate of production of vanadium trichloride by this method is very low and we have found that from a 200 lb. charge of vanadium tetrachloride in a reflux apparatus the rate of formation of vanadium trichloride is only about 40 lbs. per day.

According to our invention the decomposition of vanadium tetrachloride into vanadium trichloride and chlorine is accelerated by the use of iodine monochloride as a catalyst.

Iodine monochloride dissolves in vanadium tetrachloride and thus provides a homogeneous catalytic system. After addition of the iodine monochloride at ambient temperature the vanadium tetrachloride is warmed until the decomposition begins to take place at an appreciable rate, which is observed by the rate of evolution of chlorine. The source of heat is then removed and the reaction then proceeds smoothly, without heat input, until approximately 90 percent (e.g. 85 to 95 percent) of the vanadium tetrachloride has decomposed, at which stage the rate of reaction becomes noticeably less. The quantity of iodine monochloride may conveniently be about .05 to 1.0 percent by weight of the vanadium tetrachloride. At this stage by the application of heat and vacuum unconverted vanadium tetrachloride, iodine monochloride, vanadium oxytrichloride and any other volatile impurities are finally distilled away, leaving pure solid vanadium trichloride in the reaction vessel.

The rate of production of vanadium trichloride by our method is much higher than when the catalyst is not used. For example, 200 lbs. of vanadium tetrachloride contained in a cylindrical flat-bottomed magnesium metal container, fitted with a 2 inch diameter off-take are placed on an electrically-heated hot plate. The off-take is connected to a gaseous exhaust system through which the chlorine produced from the charge can be withdrawn and suitably dealt with, 125 g. of iodine monochloride are added on top of the vanadium tetrachloride, the hot plate switched on, and the vanadium tetrachloride warmed until chlorine starts to come off at an appreciable rate. This normally takes place at about 60 to 120° C. preferably or even higher with the use of a refluxing device. The heat supply is then switched off and left until chlorine evolution ceases. At this stage the reaction vessel is connected to a distillation system which operates under reduced pressure whereby on the application of heat unconverted vanadium tetrachloride, iodine monochloride, vanadium oxytrichloride and any other impurities are finally distilled away leaving pure solid vanadium trichloride in the reaction vessel. The whole process normally take 6–8 hours only, the yield of vanadium trichloride being 140–150 lbs. or the equivalent of 420–450 lbs. per 24 hours.

This rate of production of vanadium trichloride from vanadium tetrachloride by the method of our invention is thus seen to be much higher than by the method heretofore employed.

I claim:
1. A process for preparing $VCl_3$ comprising dissolving a catalytic amount of ICl in $VCl_4$, decomposing said $VCl_4$ by heating the mixture to a temperature within the range of 60 to 120° C. removing volatile by-products by distillation and recovering solid $VCl_3$, said amount of ICl ranging from about 0.05 to 1.0 weight percent based on the amount of $VCl_4$.

2. A process for preparing $VCl_3$ comprising dissolving a catalytic amount of ICl in $VCl_4$, decomposing said $VCl_4$ by heating the mixture to a temperature of at least 120° C. under refluxing conditions, removing chlorine, subjecting the mixture to distillation under vacuum, thereby removing by-products and recovering solid $VCl_3$, said amount of ICl ranging from about 0.05 to 1.0 weight percent based on the amount of $VCl_4$.

3. A process for preparing $VCl_3$ comprising dissolving a catalytic amount of ICl in $VCl_4$, decomposing said $VCl_4$ by heating the mixture to a temperature of at least 60° C., removing chlorine, distilling the remainder under vacuum at a temperature high enough to vaporize any unconverted $VCl_4$ and ICl, removing this vaporized $VCl_4$ and ICl, recovering solid $VCl_3$, said amount of ICl ranging from about 0.05 to 1.0 weight percent based on the amount of $VCl_4$.

References Cited

Gutmann: "Monatshefte Fur Chemie," vol. 81, 1950, pp. 1155–1157.
Aradi et al.: "Chemical Abstracts," vol. 58, April 1963, p. 6480.

OSCAR R. VERTIZ, Primary Examiner.
H. T. CARTER, Assistant Examiner.